United States Patent
Zhao

(10) Patent No.: US 9,817,455 B2
(45) Date of Patent: Nov. 14, 2017

(54) PROCESSOR AND CIRCUIT BOARD INCLUDING A POWER MANAGEMENT UNIT

(71) Applicant: NVIDIA CORPORATION, Santa Clara, CA (US)

(72) Inventor: Yu Zhao, Shenzhen (CN)

(73) Assignee: NVIDIA Corporation, Santa Clara, CA (US)

( * ) Notice: Subject to any disclaimer, the term of this patent is extended or adjusted under 35 U.S.C. 154(b) by 547 days.

(21) Appl. No.: 13/791,322

(22) Filed: Mar. 8, 2013

(65) Prior Publication Data
US 2014/0136862 A1    May 15, 2014

(30) Foreign Application Priority Data

Nov. 9, 2012    (CN) .......................... 2012 1 0449269

(51) Int. Cl.
*G06F 1/00* (2006.01)
*G06F 1/26* (2006.01)

(52) U.S. Cl.
CPC ..................... *G06F 1/26* (2013.01)

(58) Field of Classification Search
CPC ................. G06F 1/3203; G06F 1/26
USPC ....... 323/271, 265; 713/300, 322, 340, 500, 713/320, 323; 327/175; 455/76; 712/1; 318/474

See application file for complete search history.

(56) References Cited

U.S. PATENT DOCUMENTS

| | | | |
|---|---|---|---|
| 8,316,256 B2 * | 11/2012 | Ho et al. ........................ | 713/340 |
| 9,584,302 B2 * | 2/2017 | Karthik ................ | H04L 7/0008 |
| 2006/0026447 A1 * | 2/2006 | Naveh et al. ................. | 713/322 |
| 2007/0033425 A1 * | 2/2007 | Clark ............................ | 713/320 |
| 2007/0174586 A1 * | 7/2007 | Tell ........................... | G06F 1/10 |
| | | | 712/1 |
| 2009/0224732 A1 * | 9/2009 | Kudo et al. ................... | 323/271 |
| 2009/0300377 A1 * | 12/2009 | Kao et al. ..................... | 713/300 |
| 2010/0130139 A1 * | 5/2010 | Panikkath ................. | H03L 7/08 |
| | | | 455/76 |
| 2010/0188126 A1 * | 7/2010 | Cheung ................ | H03K 5/1565 |
| | | | 327/175 |
| 2011/0264938 A1 * | 10/2011 | Henroid ................ | G06F 1/3203 |
| | | | 713/323 |
| 2011/0265090 A1 * | 10/2011 | Moyer et al. ................. | 718/103 |

(Continued)

FOREIGN PATENT DOCUMENTS

TW    200928702 A    7/2009

*Primary Examiner* — Aurel Prifti
(74) *Attorney, Agent, or Firm* — Artegis Law Group, LLP

(57) ABSTRACT

The present invention provides a processor and a circuit board including the processor. The processor includes a data processing unit, and an external power supply component that is coupled to the data processing unit; wherein the data processing unit includes a power management unit that is integrated into the data processing unit, and the power management unit is used for performing power management for the data processing unit; and the power management unit further includes a pulse signal output terminal which is used for outputting a pulse-width modulation signal, and the pulse-width modulation signal controls the external power supply component to supply a stable operating voltage to the data processing unit. The present invention provides a processor with the improved performance, the improved stability and the simplified structure.

25 Claims, 2 Drawing Sheets

(56) References Cited

U.S. PATENT DOCUMENTS

| | | | |
|---|---|---|---|
| 2012/0066535 A1* | 3/2012 | Naffziger | 713/340 |
| 2012/0086416 A1* | 4/2012 | Kudo et al. | 323/265 |
| 2012/0110352 A1* | 5/2012 | Branover | G06F 1/206 713/300 |
| 2012/0117402 A1* | 5/2012 | Machnicki | G06F 1/324 713/322 |
| 2012/0297232 A1* | 11/2012 | Bircher | G06F 1/324 713/500 |
| 2013/0057190 A1* | 3/2013 | Brennenstuhl | H02P 29/028 318/474 |
| 2014/0082377 A1* | 3/2014 | Dinh et al. | 713/300 |
| 2014/0089699 A1* | 3/2014 | O'Connor et al. | 713/322 |

\* cited by examiner

PROCESSOR AND CIRCUIT BOARD INCLUDING A POWER MANAGEMENT UNIT

CROSS-REFERENCE TO RELATED APPLICATIONS

This application claims priority to Chinese Patent Application No. 201210449269.9, filed on Nov. 9, 2012, which is hereby incorporated herein by reference.

BACKGROUND OF THE INVENTION

Field of the Invention

The present invention relates generally to a field of data processing, and in particular, to a processor and a circuit board including the processor.

Description of the Related Art

With the function of a processor becoming more and more powerful and the integration of the processor becoming higher and higher, the requirement for power management is also higher and higher. However, the present processor has much higher transients in a power management process, and the power management also has some problems, such as the delay. These problems seriously affect the performance and the reliability of a system.

The processor includes a central processor, a graphics processor and so on. In the follow, take the graphics processor as an example to illustrate. In existing technology, a graphics processing unit (GPU) and a power management unit are two individual parts in the graphics processor. The design and the manufacture of the power management unit and those of the GPU are separated. The two parts communicate with each other through a control bus and some interfaces. FIG. 1 illustrates a processor 100 in the prior art, including a GPU 101, a power management unit 104 and an external power supply component 105. The GPU 101 sends a digital control signal for voltage from the control interface thereof to the power management unit 104 via a control bus 103 according to such as the I2C protocol and the Voltage Identification (VID) technology. The power management unit 104 sends a pulse-width modulation (PWM) signal to the external power supply component 105 according to the received digital control signal. The external power supply component 105 outputs a power supply signal according to the received PWM signal. The power supply signal was input into the GPU 101 via a current path 106. During this process, because the GPU 101 and the power management unit 104 are two individual parts, there are transients and noises in the processor 100.

Therefore, in order to solve the above-mentioned problems, there is a need of providing a processor which has much better performance and much simpler structure.

SUMMARY OF THE INVENTION

The present invention is related to a processor and a circuit board including the processor.

In one aspect of the invention, a processor is disclosed in the present invention. The processor includes a data processing unit, and an external power supply component that is coupled to the data processing unit; wherein the data processing unit includes a power management unit that is integrated into the data processing unit, and the power management unit is used for performing power management for the data processing unit; and the power management unit further includes a pulse signal output terminal which is used for outputting a pulse-width modulation signal, and the pulse-width modulation signal controls the external power supply component to supply a stable operating voltage to the data processing unit.

Preferably, the power management unit further includes a detecting terminal for receiving a signal of an operating voltage that is sampled from a core processing unit of the data processing unit; an operating status signal output terminal for outputting the signal of the operating voltage to the core processing unit to obtain a controlling signal for a duty cycle of the pulse-width modulation signal by being processed by the core processing unit; a controlling signal input terminal for receiving the controlling signal for the duty cycle from the core processing unit to control the pulse-width modulation signal.

Preferably, the detecting terminal, the operating status signal output terminal and the controlling signal input terminal are connected with the core processing unit by physical connections.

Preferably, the physical connections are copper wire connections.

Preferably, the power management unit further includes a detecting terminal for receiving a signal of an operating voltage that is sampled from a core processing unit of the data processing unit; a controller for calculating a duty cycle of the pulse-width modulation signal according to a difference value between the operating voltage and a desired operating voltage to control the pulse-width modulation signal.

Preferably, the controller also calculates the duty cycle of the pulse-width modulation signal according to a current change rate of the operating voltage.

Preferably, the pulse signal output terminal is a general-purpose input/output of the data processing unit.

Preferably, the external power supply component includes a multiphase power generation circuit.

Preferably, the multiphase power generation circuit includes driver circuits and MOSFETs.

Preferably, the processor includes a graphics processor and a central processor.

According to another aspect of the present invention, the invention is related to a circuit board, including a processor, wherein the processor includes a data processing unit, and an external power supply component that is coupled to the data processing unit; wherein the data processing unit includes a power management unit that is integrated into the data processing unit, and the power management unit is used for performing power management for the data processing unit; and the power management unit further includes a pulse signal output terminal which is used for outputting a pulse-width modulation signal, and the pulse-width modulation signal controls the external power supply component to supply a stable operating voltage to the data processing unit.

Preferably, the power management unit further includes a detecting terminal for receiving a signal of an operating voltage that is sampled from a core processing unit of the data processing unit; an operating status signal output terminal for outputting the signal of the operating voltage to the core processing unit to obtain a controlling signal for a duty cycle of the pulse-width modulation signal by being processed by the core processing unit; a controlling signal input terminal for receiving the controlling signal for the duty cycle from the core processing unit to control the pulse-width modulation signal.

Preferably, the detecting terminal, the operating status signal output terminal and the controlling signal input terminal are connected with the core processing unit by physical connections.

Preferably, the physical connections are copper wire connections.

Preferably, the power management unit further includes a detecting terminal for receiving a signal of an operating voltage that is sampled from a core processing unit of the data processing unit; a controller for calculating a duty cycle of the pulse-width modulation signal according to a difference value between the operating voltage and a desired operating voltage to control the pulse-width modulation signal.

Preferably, the controller also calculates the duty cycle of the pulse-width modulation signal according to a current change rate of the operating voltage.

Preferably, the pulse signal output terminal is a general-purpose input/output of the data processing unit.

Preferably, the external power supply component includes a multiphase power generation circuit.

Preferably, the multiphase power generation circuit includes driver circuits and MOSFETs.

Preferably, the circuit board includes a graphics card and a main board.

The performance and the stability of the processor provided by the present invention are significantly improved, and the structure of the processor is simple.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Example embodiments are described herein in the context of a processor and a circuit board including the processor. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments as illustrated in the accompanying drawings. The same reference numbers will be used to the extent possible throughout the drawings and the following description to refer to the same or like items.

The present invention is related to a processor. The ordinary skilled in the art could understand that the processor may include a central processor and a graphics processor.

Figure 1:
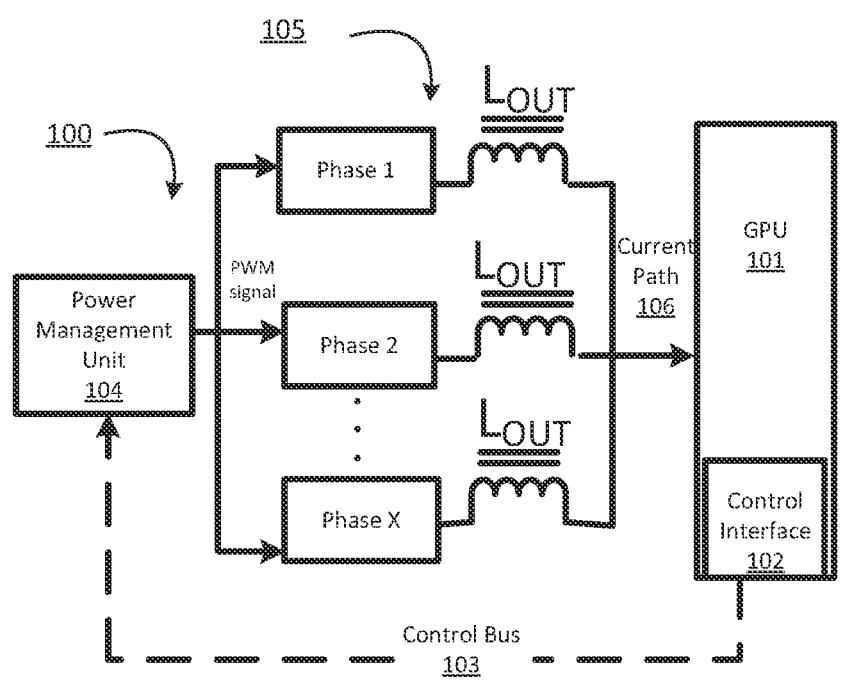
FIG. 1 is a schematic diagram of a processor in the prior art.
Figure 2:
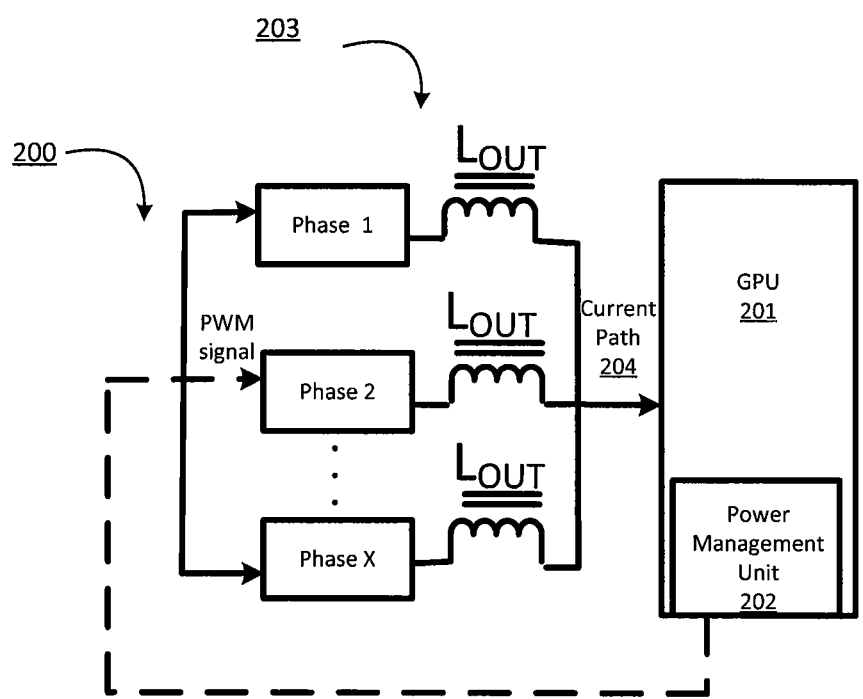
FIG. 2 is a schematic diagram of a processor according to a preferred embodiment of the present invention.

In the following, take a graphics processor as an example to describe the processor in detail. FIG. 2 shows a schematic diagram of a graphics processor 200 according to a preferred embodiment of the present invention. The graphics processor 200 includes a data processing unit 201 and an external power supply component 203 that is coupled to the data processing unit 201. In the exemplary embodiment, the data processing unit is a GPU. The GPU 201 includes a power management unit 202 that is integrated into the GPU 201, and the power management unit 202 is used for performing power management for the GPU 201. The power management unit 202 further includes a pulse signal output terminal which is used for outputting a PWM signal, and the PWM signal controls the external power supply component 203 to supply a stable operating voltage to the GPU 201.

In the exemplary embodiment, the power management unit 202 is integrated into the GPU 201 of the graphics processor 200, which avoids the requirement for a communication bus between the GPU and the power management unit 202 and reduces the complexity of a circuit board. Meanwhile, on one hand, an external sensitive signal of a chip is not produced, and in turn the risk of system failure is decreased; on the other hand, the control signal is not delayed, the reason of all of which is that the power management unit 202 communicates with other units of the GPU 201 in the GPU 201.

An external power supply of the GPU 201 supplies power to the power management unit 202 that is integrated into the GPU 201, and the power management unit 202 generates the PWM signal according to the operating voltage required by the GPU 201. The PWM signal output terminal of the power management unit 202 outputs the PWM signal to supply to the GPU 201 via the external power supply component 203.

According to one exemplary embodiment of the present invention, the power management unit 202 may further include a detecting terminal, an operating status signal output terminal and a controlling signal input terminal. The detecting terminal for receiving a signal of an operating voltage that is sampled from a core processing unit of the GPU 201. The operating status signal output terminal for outputting the signal of the operating voltage to the core processing unit to obtain a controlling signal for a duty cycle of the PWM signal by being processed by the core processing unit. A controlling signal input terminal for receiving the controlling signal for the duty cycle from the core processing unit to control the PWM signal.

The ordinary skilled in the art could understand that the detecting terminal, the operating status signal output terminal and the controlling signal input terminal mentioned above may be merged into one terminal. Preferably, the detecting terminal, the operating status signal output terminal and the controlling signal input terminal can be connected with the core processing unit by physical connections. The ordinary skilled in the art could understand that the detecting terminal, the operating status signal output terminal and the controlling signal input terminal could also be connected with the core processing unit by high-speed bus connections. Both the power management unit 202 and the core processing unit are located in the GPU 201, and the distance between these two is small. The low-cost internal physical connections can satisfy the connection between the power management unit 202 and the core processing unit because the electrical signals between these are simple. The high-speed bus connections could avoid additional wiring, but there is various complex data transmitted via the high-speed bus connections. So an unexpected error may be produced if the detecting terminal, the operating status signal output terminal and the controlling signal input terminal are connected with the core processing unit by the high-speed bus connections. The ordinary skilled in the art could understand that the above-mentioned physical connections may be copper wire connections, which could not only save cost but also satisfy the requirement. The connections certainly may be other mental wire connections, for example platinum wire connections, aluminum wire connections, etc.

The power management unit 202 determines current operating status of the GPU 201 by sampling the operating voltage of the core processing unit. And the power management unit 202 receives the signal of the operating voltage that is sampled from the core processing unit of the GPU 201 via the detecting terminal. Then the signal of the operating voltage is output to the core processing unit. The controlling signal for a duty cycle of the PWM signal to be output is calculated by the core processing unit. And then the power management unit 202 receives the controlling signal for the duty cycle from the core processing unit via the controlling signal input terminal. The power management unit 202 controls the PWM signal to be output according to the received controlling signal for the duty cycle.

When the load of the GPU 201 gets larger, the operating voltage of the core processing unit is decreased. At this time, the power management unit 202 receives the controlling signal for the duty cycle which makes the duty cycle of the PWM signal get larger. Finally, the power management unit 202 outputs the PWM signal with the larger duty cycle to the GPU 201 via the external power supply component to satisfy the requirement of the load of the GPU 201.

As known to all, the GPU 201 has a powerful calculating capability, which may calculate the required operating voltage according to the current load condition of the core processing unit to achieve well power controlling. A transfer function for controlling which is very complex and even unable to be achieved by an existing the power management unit may be very easy for a GPU. In the exemplary embodiment, the power management unit 202 could effectively power management by using the GPU 201, because the power management unit 202 is located in the GPU 201.

According to another exemplary embodiment of the present invention, the power management unit 202 may further include a detecting terminal and a controller. The detecting terminal is used for receiving a signal of an operating voltage that is sampled from a core processing unit of the GPU 201. The controller for calculating a duty cycle of the PWM signal according to a difference value between the operating voltage and a desired operating voltage to control the PWM signal.

Similar with the previous exemplary embodiment, the power management unit 202 receives the signal of the operating voltage that is sampled from the core processing unit of the GPU 201 via the detecting terminal. The controller of the power management unit 202 calculates a difference value between the operating voltage and the desired operating voltage, and controls the duty cycle of the PWM signal according to the different value. For example, if the desired operating voltage of the core processing unit is higher than the sampled actual operating voltage, the controller determines a higher duty cycle. The power management unit 202 outputs the PWM signal with the higher duty cycle determined by the controller to the GPU 201.

Preferably, the controller of the power management unit 202 also calculates the duty cycle of the PWM signal according to a current change rate of the operating voltage. The power management unit 202 obtains the current change rate of the operating voltage of the core processing unit by sampling the operating voltage of the core processing unit during a period. The controller calculates the duty cycle of the PWM signal according to a current change rate of the operating voltage to control the PWM signal.

For example, the power management unit 202 samples the operating voltage of the core processing unit during 1 microsecond and is known that the current change rate of the operating voltage of the core processing unit gets smaller during this period. Therefore, the controller could forecasts that the load change of the GPU 201 is decreased according to the current change rate of the operating voltage. So the operating voltage of the core processing unit could not be changed very quickly, and the adjusting speed of the duty cycle of the PWM signal could be slowed down. In this way, over modulation could be avoided, and then the stability of the graphics processor may be improved and the power management may be more accurate.

The pulse signal output terminal of the power management unit 202 may be a general-purpose input/output (GPIO) of the GPU 201. The GPIO is an existing interface on the processor, which may be programmable. In an exemplary embodiment of the present invention, the power management unit 202 outputs a PWM signal via a GPIO instead of a special interface, which simplifies the design of the processor.

The external power supply component may include a multiphase power generation circuit. The multiphase power generation circuit may include multiple BUCK circuits in parallel. Each BUCK circuit receives a PWM signal. The multiphase power generation circuit outputs a voltage required by the GPU 201. Wherein the phase number of the multiphase power generation circuit depends on a full-load current of the GPU 201. If one phase of the multiphase power generation circuit may support a 25 A current, the phase number of the multiphase power generation circuit is a ratio of the amperage of the full-load current of the GPU 201 to 25 A. For example, provided that the full-load current of the GPU 201 is about 75 A, the phase number of the multiphase power generation circuit is 3.

In present exemplary embodiment, the structure of the external power supply component may be very simple. Preferably, each BUCK circuit of the multiple BUCK circuits may include driver circuits and MOSFETs. The MOSFETs may be integrated.

According to another aspect of the present invention, a circuit board is disclosed. The circuit board includes the above-mentioned processor. For brevity, a detailed description is omitted for the processor described with reference to the above embodiments. Those skilled in the art can understand that the specific structure and the operation mode of the processor with reference to FIG. 2 in combination with the above description.

In the circuit board, the power management unit is integrated into the data processing unit. The complexity of the wiring is reduced. Meanwhile, the controlling delay in the power management process is reduced and the transient performance of the circuit board is improved, because all the communication between the power management unit and the other units of the data processing unit is in the data processing unit.

The circuit board may be any circuit board that comprises the above-mentioned processor. Optionally, the circuit board includes a graphics card and a main board.

It should be appreciated that various modifications, adaptations and alternative embodiments thereof may be made within the scope and spirit of the present invention. The invention is further defined by the following claims.

The invention claimed is:

1. A processor, including:
   a data processing unit comprising a power management unit and a core processing unit and configured to calculate a first operating voltage associated with operating the core processing unit based on a transfer function and on a first load condition associated with the core processing unit, wherein the power management unit is configured to:
      calculate a first difference value between the first operating voltage and a desired operating voltage for operating the core processing unit, and
      calculate a first duty cycle of a pulse-width modulated signal based on the first difference value,
      wherein the data processing unit is configured to output the pulse-width modulated signal having the first duty cycle; and
   an external power supply component that is coupled to the data processing unit and configured to receive the pulse-width modulated signal having the first duty cycle from the data processing unit and to supply a modified first operating voltage associated with operating the core processing unit based on the pulse-width modulated signal having the first duty cycle.

2. The processor of claim 1, wherein the power management unit further includes:
   a detecting terminal for receiving a signal of the first operating voltage that is sampled from the core processing unit of the data processing unit;
   an operating status signal output terminal for outputting the signal of the first operating voltage to the core processing unit to obtain a controlling signal for a duty cycle of the pulse-width modulation signal by being processed by the core processing unit;
   a controlling signal input terminal for receiving the controlling signal for the duty cycle from the core processing unit to control the pulse-width modulation signal.

3. The processor of claim 2, wherein the detecting terminal, the operating status signal output terminal and the controlling signal input terminal are connected with the core processing unit by physical connections.

4. The processor of claim 3, wherein the physical connections are copper wire connections.

5. The processor of claim 1, wherein the power management unit further includes:
   a detecting terminal for receiving a signal of the first operating voltage that is sampled from the core processing unit of the data processing unit; and
   a controller for calculating the first duty cycle of the pulse-width modulation signal according to a difference value between the first operating voltage and the desired operating voltage to control the pulse-width modulation signal.

6. The processor of claim 1, wherein the power management unit also calculates the first duty cycle of the pulse-width modulation signal according to a current rate at which the first operating voltage is changing.

7. The processor of claim 1, wherein the power management unit includes a pulse signal output terminal that is a general-purpose input output of the data processing unit.

8. The processor of claim 1, wherein the external power supply component includes a multiphase power generation circuit.

9. The processor of claim 8, wherein the multiphase power generation circuit includes driver circuits and MOSFETs (metal-oxide-semiconductor field effect transistors).

10. The processor of claim 1, wherein the processor includes a graphics processor and a central processor.

11. The processor of claim 1, wherein the power management unit is further configured to:
    calculate a second difference value between a second operating voltage and the desired operating voltage, wherein the second difference is greater than the first difference, and
    calculate a second duty cycle of the pulse-width modulated signal based on the second difference value, wherein the second duty cycle is greater than the first duty cycle.

12. The processor of claim 1, wherein the first duty cycle is further based on a first rate at which the first operating voltage is changing.

13. The processor of claim 12, wherein the power management unit is further configured to:
    determine a second change rate associated with the first operating voltage, wherein the second change rate is less than the first change rate, and
    calculate a third difference value between the first change rate and the second change rate, and
    calculate a third duty cycle of the pulse-width modulated signal based on the third difference value, wherein the third duty cycle is less than the first duty cycle.

14. A circuit board, including:
    a processor, wherein the processor includes:
       a data processing unit comprising a power management unit and a core processing unit and configured to calculate a first operating voltage associated with operating the core processing unit based on a function and on a first load condition associated with the core processing unit, wherein the power management unit is configured to:
          calculate a first difference value between the first operating voltage and a desired operating voltage for operating the core processing unit, and
          calculate a first duty cycle of a pulse-width modulated signal based on the first difference value,
          wherein the data processing unit is configured to output the pulse-width modulated signal having the first duty cycle; and
       an external power supply component that is coupled to the data processing unit and configured to receive the pulse-width modulated signal having the first duty cycle from the data processing unit and to supply a modified first operating voltage associated with operating the core processing unit based on the pulse-width modulated signal having the first duty cycle.

15. The circuit board of claim 14, wherein the power management unit further includes:
    a detecting terminal for receiving a signal of the first operating voltage that is sampled from the core processing unit of the data processing unit;
    an operating status signal output terminal for outputting the signal of the first operating voltage to the core processing unit to obtain a controlling signal for a duty cycle of the pulse-width modulation signal by being processed by the core processing unit;

a controlling signal input terminal for receiving the controlling signal for the duty cycle from the core processing unit to control the pulse-width modulation signal.

16. The circuit board of claim 15, wherein the detecting terminal, the operating status signal output terminal and the controlling signal input terminal are connected with the core processing unit by physical connections.

17. The circuit board of claim 16, wherein the physical connections are copper wire connections.

18. The circuit board of claim 14, wherein the power management unit further includes:
   a detecting terminal for receiving a signal of the first operating voltage that is sampled from the core processing unit of the data processing unit;
   a controller for calculating the duty cycle of the pulse-width modulation signal according to a difference value between the first operating voltage and a desired operating voltage to control the pulse-width modulation signal.

19. The circuit board of claim 14, wherein the power management unit also calculates the first duty cycle of the pulse-width modulation signal according to a current rate at which the first operating voltage is changing.

20. The circuit board of claim 14, wherein the power management unit includes a pulse signal output terminal that is a general-purpose input /output of the data processing unit.

21. The circuit board of claim 14, wherein the external power supply component includes a multiphase power generation circuit.

22. The circuit board of claim 21, wherein the multiphase power generation circuit includes driver circuits and MOSFETs (metal-oxide-semiconductor field effect transistors).

23. The circuit board of claim 14, wherein the circuit board includes a graphics card and a main board.

24. A processor, comprising:
   a data processing unit comprising a power management unit and a core processing unit and configured to calculate a first operating voltage associated with operating the core processing unit based on a transfer function and on a first load condition associated with the core processing unit, wherein the power management unit is configured to:
      calculate a first difference value between the first operating voltage and a desired operating voltage for operating the core processing unit, and
      calculate a first duty cycle of a pulse-width modulated signal based on the first difference value and according to a current rate at which the first operating voltage is changing; and
   an external power supply component that is coupled to the data processing unit and configured to supply a modified first operating voltage associated with operating the core processing unit based on the pulse-width modulated signal.

25. A circuit board, including:
a processor, wherein the processor includes:
   a data processing unit comprising a power management unit and a core processing unit and configured to calculate a first operating voltage associated with operating the core processing unit based on a function and on a first load condition associated with the core processing unit, wherein the power management unit is configured to:
      calculate a first difference value between the first operating voltage and a desired operating voltage for operating the core processing unit, and
      calculate a first duty cycle of a pulse-width modulated signal based on the first difference value and according to a current rate at which the first operating voltage is changing; and
   an external power supply component that is coupled to the data processing unit and configured to supply a modified first operating voltage associated with operating the core processing unit based on the pulse-width modulated signal.

* * * * *